United States Patent
Cho

(10) Patent No.: US 6,392,708 B1
(45) Date of Patent: May 21, 2002

(54) HORIZONTAL DISPLAY SIZE COMPENSATION CIRCUIT FOR A MONITOR

(75) Inventor: Yong-Moon Cho, Suwon (KR)

(73) Assignee: Samsung Electronics Co. Ltd., Suwon (KR)

( * ) Notice: Subject to any disclaimer, the term of this patent is extended or adjusted under 35 U.S.C. 154(b) by 0 days.

(21) Appl. No.: 09/123,543

(22) Filed: Jul. 28, 1998

(30) Foreign Application Priority Data

Jul. 31, 1997 (KR) .......................................... 97-21227 U

(51) Int. Cl.[7] ................................................. H04N 3/22
(52) U.S. Cl. ...................... 348/556; 348/511; 348/530; 348/531; 348/540; 348/806
(58) Field of Search ................................. 348/540, 542, 348/543, 552, 554, 556, 511, 530, 531, 536, 445, 581, 704, 561, 806; 315/8; 345/698, 699; H04N 3/22, 3/223

(56) References Cited

U.S. PATENT DOCUMENTS

| | | | | |
|---|---|---|---|---|
| 5,021,720 A | * | 6/1991 | Aimura | 315/370 |
| 5,161,012 A | * | 11/1992 | Choi | 358/183 |
| 5,241,281 A | * | 8/1993 | Wilkes et al. | 358/180 |
| 5,325,025 A | * | 6/1994 | Gawell et al. | 315/370 |
| 5,329,211 A | * | 7/1994 | Sasaki et al. | 315/371 |
| 5,751,370 A | * | 5/1998 | Lee | 348/556 |
| 5,777,520 A | * | 7/1998 | Kawakami | 315/399 |
| 5,859,626 A | * | 1/1999 | Kawamura | 345/682 |
| 5,870,073 A | * | 2/1999 | Kitou et al. | 345/698 |
| 5,874,937 A | * | 2/1999 | Kesatoshi | 345/428 |
| 5,914,728 A | * | 6/1999 | Yamagishi et al. | 345/507 |
| 5,963,266 A | * | 10/1999 | Fujimori | 348/511 |
| 5,963,268 A | * | 10/1999 | Ko | 348/556 |
| 6,008,791 A | * | 12/1999 | Arai et al. | 345/132 |
| 6,037,994 A | * | 3/2000 | Bae | 348/554 |
| 6,097,440 A | * | 8/2000 | Omori et al. | 348/542 |
| 6,339,412 B1 | * | 1/2002 | Lee | 327/2 |

FOREIGN PATENT DOCUMENTS

| | | | |
|---|---|---|---|
| JP | 3-155283 | * | 7/1991 |
| JP | 7-92928 | * | 4/1995 |

* cited by examiner

Primary Examiner—John W. Miller
Assistant Examiner—Brian P. Yenke
(74) Attorney, Agent, or Firm—Robert E. Bushnell, Esq.

(57) ABSTRACT

A horizontal display size compensation circuit for a monitor prevents a horizontal display size of a monitor screen from being changed when a horizontal frequency varies according to a video mode. A horizontal frequency is generated by a horizontal frequency generation section corresponding to each video mode. A microcomputer generates a predetermined horizontal display size compensation signal according to the horizontal frequency corresponding to each video mode and a horizontal display size adjustment signal corresponding to an input of a key input section, and a horizontal display size control section controls a horizontal display size of the monitor screen by supplying the horizontal display size adjustment signal of the microcomputer and the horizontal display size compensation signal to the horizontal frequency. Therefore, a horizontal display size of a monitor screen is prevented from varying according to a video mode.

13 Claims, 4 Drawing Sheets

| VIDEO MODE | HORIZONTAL FREQUENCY(fH) | HORIZONTAL DISPLAY SIZE |
|---|---|---|
| 640 X 200 | 15.7KHz | SMALL |
| 640 X 350 | 21.8KHz | ↓ |
| 640 X 480 | 31.5KHz | |
| 800 X 600 | 35.5KHz | |
| 1024 X 768 | 55KHz | LARGE |

HORIZONTAL DISPLAY SIZE COMPENSATION CIRCUIT FOR A MONITOR

CLAIM OF PRIORITY

This application makes reference to, incorporates the same herein, and claims all benefits accruing under 35 U.S.C. §119 from an application for HORIZONTAL DISPLAY SIZE COMPENSATION CIRCUIT FOR A MONITOR earlier filed in the Korean Industrial Property Office on the Jul. 31, 1997 and there duly assigned Serial No. 21227/1997.

BACKGROUND OF THE INVENTION

1. Field of the Invention

The present invention relates to a monitor, and more particularly to a horizontal display size compensation technique for a monitor which prevents a horizontal display size of a monitor screen from being changed when a horizontal frequency varies according to a video mode.

2. Description of the Prior Art

In an earlier horizontal display size compensation circuit for a monitor, a horizontal deflection oscillation section has an oscillation circuit for generating a predetermined deflection frequency by charging and discharging a capacitor. A horizontal deflection drive section is provided to amplify and correct a deflection frequency waveform of the horizontal deflection oscillation section, and a horizontal deflection output section is provided to control the current flowing in a horizontal deflection coil according to a deflection frequency of the horizontal deflection drive section. A microcomputer outputs a horizontal display size control signal according to an input signal of a key input section which is operated by a user and detects each video mode which will be outputted to a monitor screen. A horizontal frequency generation section generates a horizontal frequency according to the video mode of the microcomputer. A horizontal display size control section is provided to control a horizontal screen display size according to a horizontal frequency of the horizontal frequency generation section and a horizontal display size control signal of the microcomputer and a horizontal display size output section is also provided to supply a signal of the horizontal display size control section to the horizontal deflection output section.

When a user controls a horizontal display size compensation size through the key input section, the microcomputer outputs outputs a horizontal display size control signal to the horizontal display size control section for a screen display size. The horizontal display size control signal is supplied to the horizontal display size control section which is preset in the microcomputer in accordance with each key input. Therefore, the horizontal display size control section controls a horizontal screen display size by supplying a voltage of a horizontal display size control signal to a horizontal frequency inputted form the horizontal frequency generation section. A monitor outputs images of video modes having different resolutions, and different predetermined horizontal frequencies are outputted in accordance with the video mode and accordingly, a horizontal screen display size of a monitor freely varies by a change of a horizontal frequency according to a video mode.

Since a desired image can not be precisely displayed due to a variation of a display size according to a video mode, there exists a drawback in that a user manually corrects a horizontal display size of a monitor screen through a key input while seeing a variation of the horizontal display size when the user corrects a variation of the horizontal display size of the monitor screen according to a change of a video mode.

SUMMARY OF THE INVENTION

In order to solve the above drawback, it is an object of the present invention to provide a horizontal display size compensation technique for a monitor to compensate a horizontal display size by supplying a voltage according to a horizontal frequency, so that a variation of a horizontal display size of a monitor screen according to different video modes is prevented.

To obtain the above object, the present invention comprises: a horizontal frequency generation section for generating a horizontal frequency corresponding to each video mode; a microcomputer for outputting a horizontal display size control signal according to an input of a key input section, and for outputting a predetermined horizontal display size compensation signal according to the horizontal frequency corresponding to a video mode; and a horizontal display size control section for controlling a horizontal display size of a monitor screen according to the horizontal frequency of the horizontal frequency generation section, the horizontal display size control signal and the horizontal display size compensation signal of the microcomputer.

Further, the horizontal display size compensation signal of the microcomputer is set to a predetermined voltage which increases in accordance with an increase of the horizontal frequency corresponding to a video mode, and the horizontal display size compensation signal is preferably supplied with a horizontal frequency which is inputted from the horizontal frequency generation section to the horizontal display size control section.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENT

Figure 1:
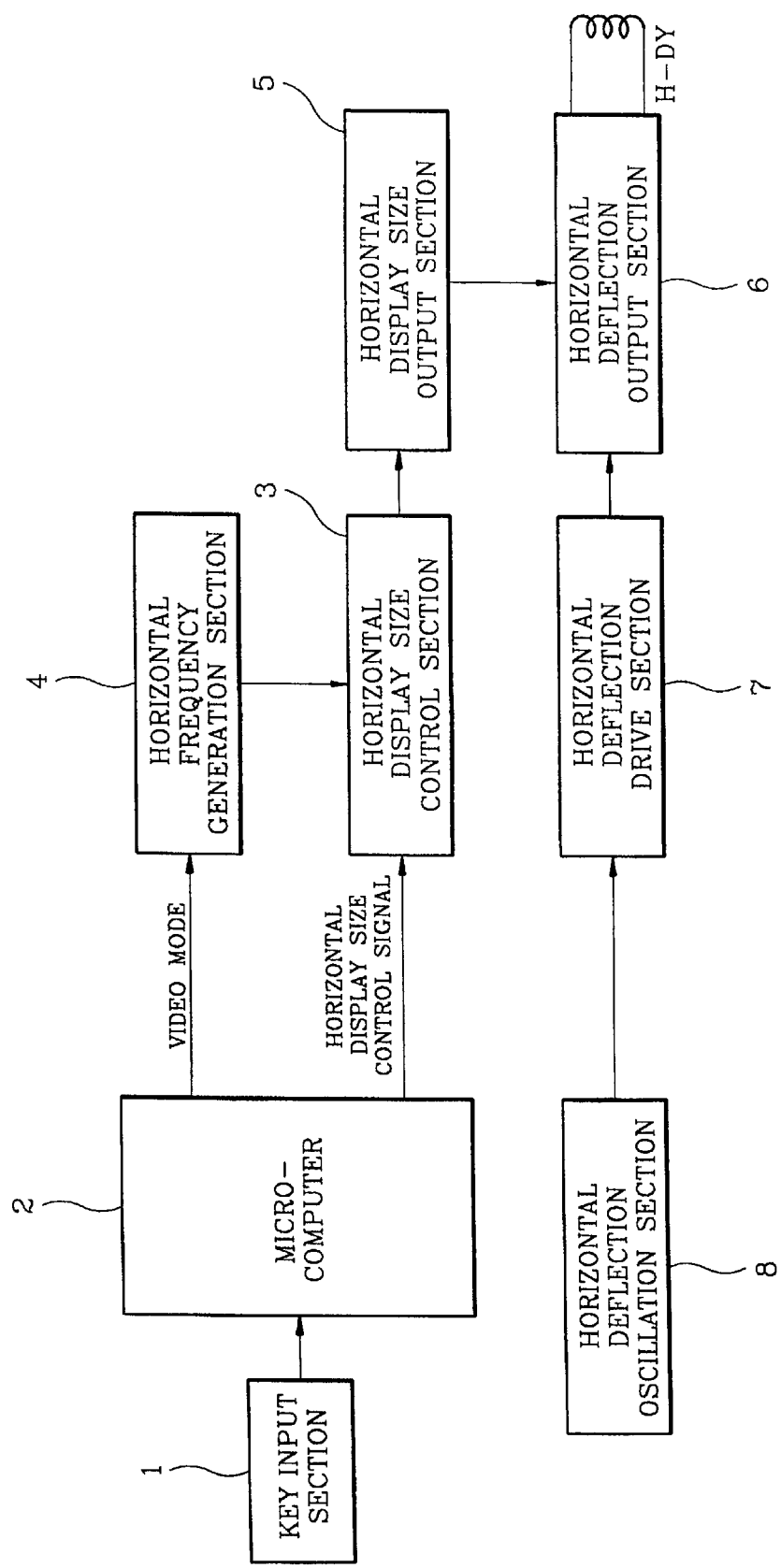
FIG. 1 is a schematic block diagram of an earlier horizontal display size compensation circuit for a monitor.

Hereinafter, a horizontal display size compensation circuit for a monitor according to a preferred embodiment of the present invention will be described in detail with reference to the accompanying drawings. The same reference numerals are applied to the same elements in all the drawings.

FIG. 1 is a schematic block diagram of an earlier horizontal display size compensation circuit for a monitor.

As shown in FIG. 1, the horizontal deflection oscillation section 8 has an oscillation 8 circuit (not shown) therein for generating a predetermined deflection frequency by charging and discharging a capacitor. Further, there is a horizontal deflection drive section 7 provided to amplify and correct a deflection frequency waveform of the horizontal deflection oscillation section 8, and there is a horizontal deflection output section 6 provided to control current flowing in a horizontal deflection coil H-DY according to a deflection frequency of the horizontal deflection drive section 7. A microcomputer 2 outputs a horizontal display size control signal according to an input signal of a key input section 1 which is operated by a user, and detects each video mode which will be outputted to a monitor screen. A horizontal frequency generation section 4 generates a horizontal frequency according to a video mode of the microcomputer 2. A horizontal display size control section 3 is provided to control a horizontal screen display size according to a horizontal frequency of the horizontal frequency generation section 4 and a horizontal display size control signal of the microcomputer 2, and a horizontal display size output section 5 is also provided to supply a signal of the horizontal display size control section 3 to the horizontal deflection output section 6.

In the earlier horizontal display size compensation circuit for a monitor constructed as above, the horizontal deflection oscillation section 8 outputs a predetermined deflection frequency, and the horizontal deflection drive section 7 supplies an amplified and corrected deflection frequency to the horizontal deflection output section 6. Accordingly, the horizontal deflection output section 6 controls the current flowing in the horizontal deflection coil H-DY according to a deflection frequency of the horizontal deflection drive section 7 so as to deflect a horizontal direction of an electron beam for an display on the screen.

Further, the horizontal display size control section 3 inputs a horizontal frequency corresponding to each video mode from the horizontal frequency generation section 4. Different horizontal frequencies are outputted from the horizontal frequency generation section 4, so that a horizontal screen display size is set in accordance with the horizontal frequency.

The horizontal screen display size varies according to a change of a video mode or an input of a user. That is, when a user controls a horizontal screen display size through the key input section 1, the microcomputer 2 outputs a horizontal display size control signal to the horizontal display size control section 3 for a screen display size. The horizontal display size control signal is supplied to the horizontal display size control section 3 at a voltage of 0–5V which is preset in the microcomputer in accordance with each key input. Therefore, the horizontal display size control section 3 controls a horizontal screen display size by supplying a voltage of a horizontal display size control signal to a horizontal frequency inputted from the horizontal frequency generation section 4.

A monitor outputs images of video modes having different resolutions, and different predetermined horizontal frequencies are outputted in accordance with the video mode. Accordingly, a horizontal screen display size of a monitor freely varies by a change of a horizontal frequency according to a video mode.

As described above, in the earlier horizontal display size compensation circuit for a monitor, since a desired image can not be precisely displayed due to a variation of a display size according to a video mode, there exists a drawback in that a user manually corrects a horizontal display size of a monitor screen through a key input while seeing a variation of the horizontal display size when the user corrects a variation of the horizontal display size of the monitor screen according to a change of a video mode.

Figure 2:
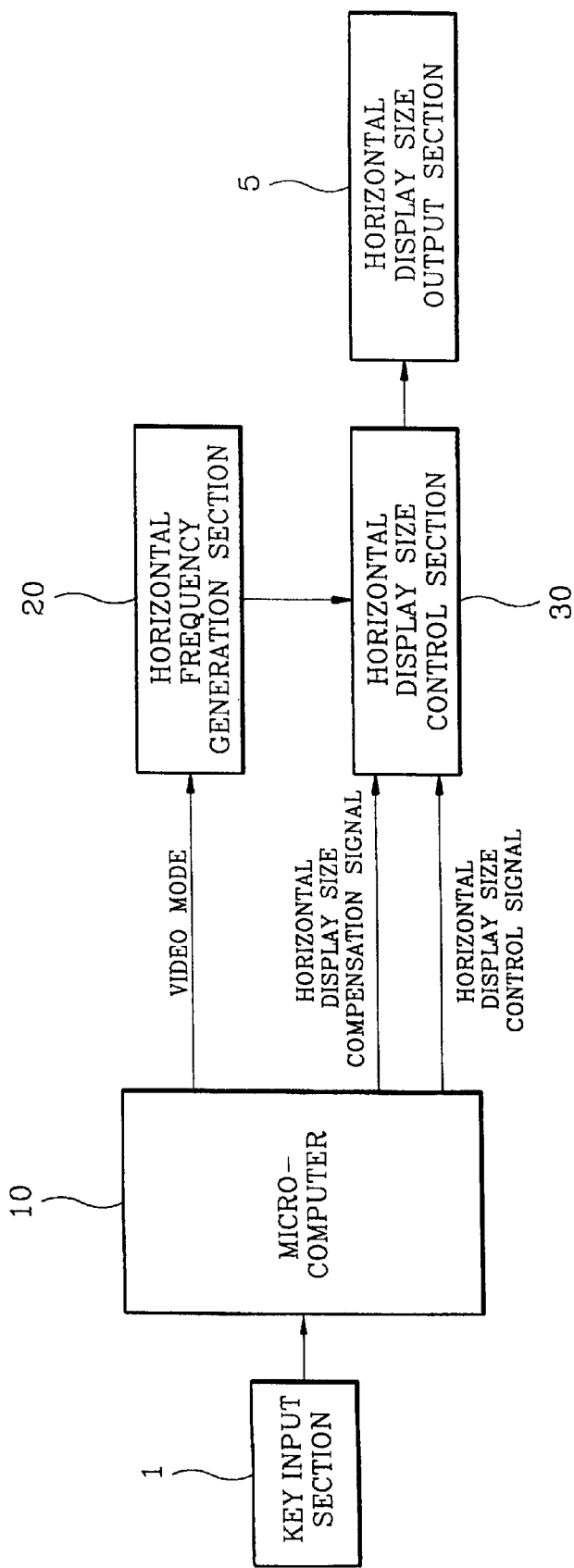
FIG. 2 is a block diagram showing a horizontal display size compensation circuit for a monitor according to an embodiment of the present invention.
Figure 3:
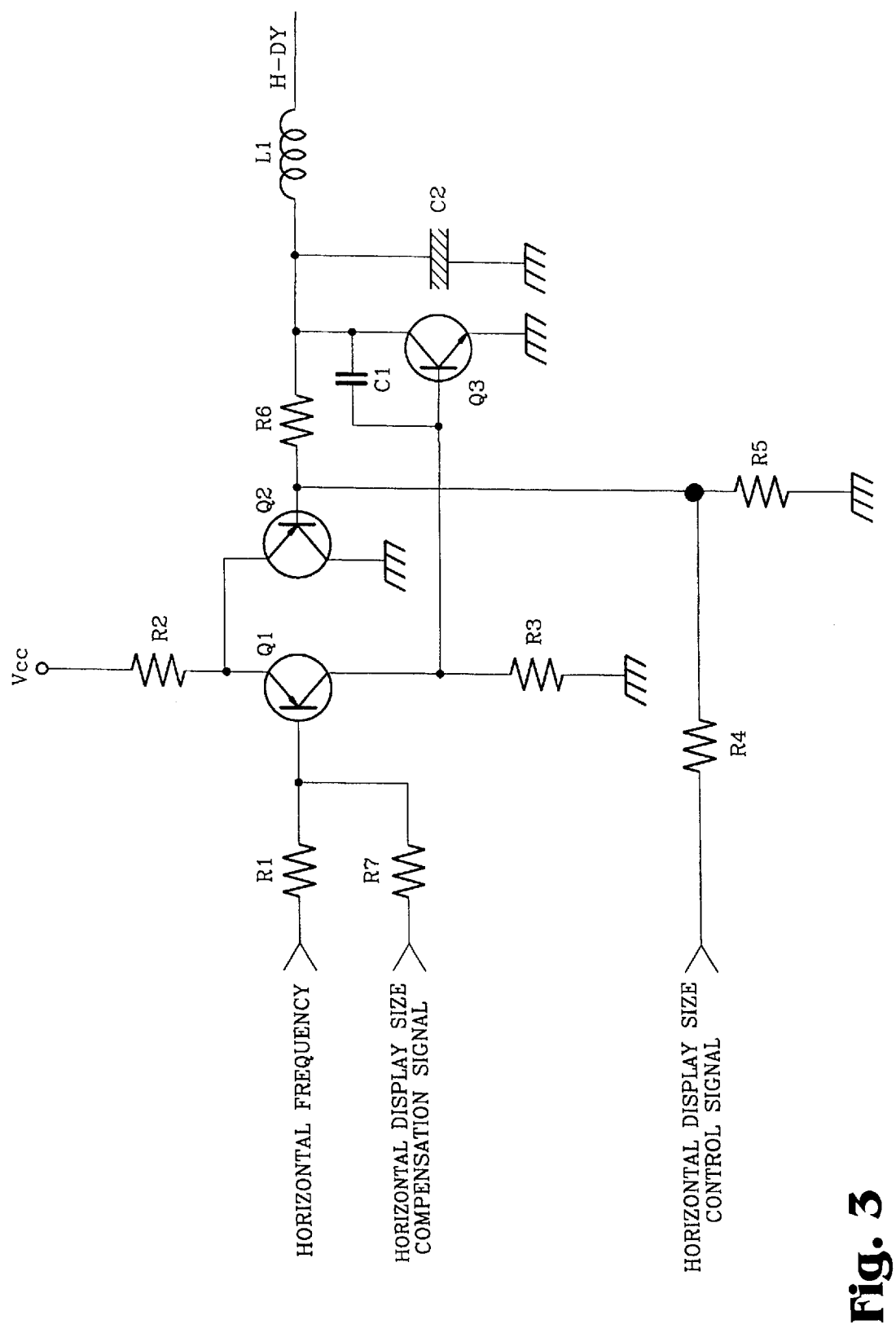
FIG. 3 is a detailed circuit of a horizontal display size control section of FIG. 2.

FIG. 2 is a block diagram showing a horizontal display size compensation circuit for a monitor according to an embodiment of the present invention, and FIG. 3 is a detailed circuit of a horizontal display size control section of FIG. 2. As shown in FIGS. 2 and 3, a horizontal frequency generation section 20 generates a horizontal frequency corresponding to each video mode, a microcomputer 10 outputs a predetermined horizontal display size compensation signal according to a horizontal display size control signal corresponding to each video mode and a horizontal frequency corresponding to each video mode. Further, a horizontal display size control section 30 is supplied with a horizontal frequency of the horizontal frequency generation section 20, a horizontal display size control signal and a horizontal display size compensation signal of the microcomputer 10. A horizontal display size of a monitor screen is controlled through a horizontal display size output section 5. Further, as shown in FIG. 3, the horizontal display size control section 30 includes transistors Q1 and Q2 effecting differential amplification, and another transistor Q3 for controlling current flowing through a coil L1 and a capacitor C2 according to an output current of the transistor Q1, wherein the current controlled by the coil L1 and the capacitor C2 is supplied to a horizontal deflection coil H-DY.

A horizontal frequency fH of the horizontal frequency generation section 20 is supplied to the base of the transistor Q1 through a resistor R1, and a horizontal display size compensation signal inputted from the microcomputer 10 is supplied to the horizontal frequency fH through a resistor R7.

The horizontal display size control signal from the microcomputer 10 is divided by resistors R4 and R5 and supplied to the base of the transistor Q2.

Elements R2, R3, and R6 are voltage-control resistors, and element C1 is a damping capacitor.

Figures 4, 5:
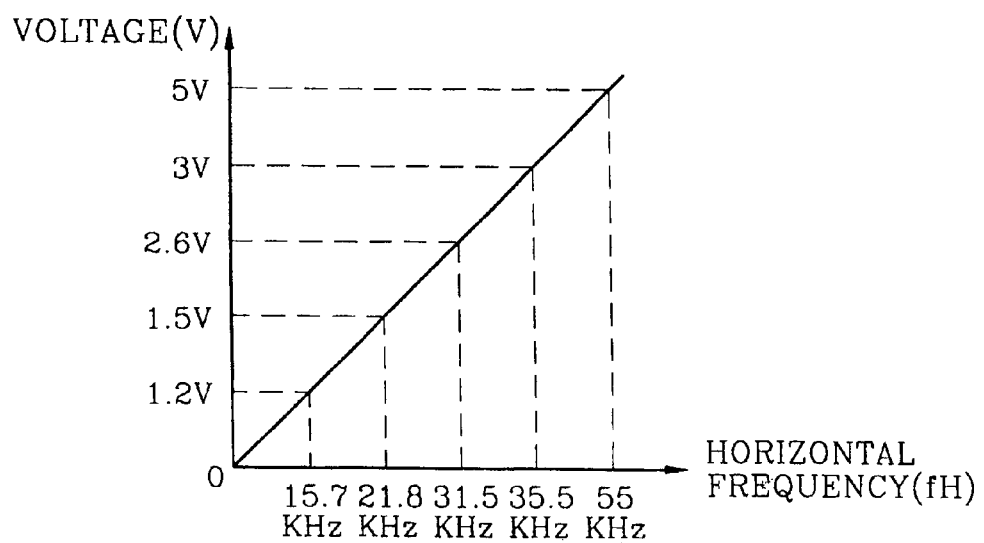
FIG. 4 is a table showing a horizontal display size versus a horizontal frequency according to a video mode.
FIG. 5 is a graph showing a output voltage of a microcomputer for compensating for a variations of a horizontal display size of a monitor screen in accordance with a horizontal frequency.

FIG. 4 is a table showing a horizontal display size versus a horizontal frequency according to a video mode, and FIG. 5 is a graph for showing a output voltage of a microcomputer for compensating for a variations of a horizontal display size of a monitor screen in accordance with a horizontal frequency.

As shown in FIG. 5, the horizontal display size compensation signal of the microcomputer 10 is preferably set to a predetermined voltage which increases in accordance with an increase of a horizontal frequency corresponding to a video mode.

Operations of the preferred embodiment according to the present invention constructed as above will be described in detail hereinafter.

The horizontal frequency generation section 20, as shown in FIG. 4, generates different horizontal frequencies fH according to video modes which will be displayed on the screen. According to this, a horizontal display size of a monitor screen is set in correspondence with the horizontal frequency. That is, the horizontal display size control section 30 inputs a horizontal frequency fH corresponding to each video mode from the horizontal frequency generation section 20, and a horizontal display size of a monitor screen is controlled through the horizontal display size output section 5.

The horizontal display size of a monitor screen outputted as above varies according to a change of a video mode or an input of a user. That is, when a user controls a horizontal display size of a monitor screen through a key input section 1, the microcomputer 10 outputs a horizontal display size control signal for a monitor screen to the horizontal display size control section 30 according to a key input. The horizontal display size control signal is converted to a predetermined voltage of 0–5V through the microcomputer 10 and the voltage is supplied to the horizontal display size control section 30. Therefore, the horizontal display size control section 30 supplies a voltage of a horizontal display size control signal to a horizontal frequency fH from the horizontal frequency generation section 20, so that a horizontal display size of a monitor screen is controlled.

Described in more detail with reference to FIG. 3, the base of the transistor Q3 performing differential amplification inputs a horizontal frequency fH from the horizontal frequency generation section 20, and the base of the transistor Q2 is supplied with a horizontal display size control signal from the microcomputer 10. The horizontal display size control signal from the microcomputer 10 is a voltage of 0–5V as described above. The voltage is divided by the resistors R4 and R5 to be supplied to the base of the transistor Q2. Accordingly, since an output voltage of the transistor Q1 is proportional to a difference between inputted voltages, a horizontal display size control signal varies to control the horizontal display size of a monitor screen. The transistor Q3 controls current flowing in the coil L1 and the capacitor C2 to be outputted to the horizontal deflection coil H-DY.

Since a monitor displays images of video modes having different resolutions, different predetermined horizontal frequencies fH are outputted when a video mode is changed. Accordingly, a horizontal display size of a monitor screen freely varies by a change of a horizontal frequency fH according to a video mode. A horizontal display size compensation signal from the microcomputer 10 corrects a horizontal display size which freely varies.

Described in more detail with reference to FIG. 3, as mentioned before, the base of the transistor Q1 is supplied with a horizontal frequency fH from the horizontal frequency generation section 20, and the base of the transistor Q2 is provided with a horizontal display size control signal inputted from the microcomputer 10. The horizontal display size control signal varies to control a horizontal display size of a monitor screen. In case of a change of the horizontal frequency fH due to a variation of a video mode, the microcomputer 10 outputs a voltage according to each video signal as a horizontal display size compensation signal to be supplied to the horizontal frequency fH.

Further, the horizontal display size compensation signal of the microcomputer 10 is, as shown in FIG. 5, preferably a voltage of 5V at a horizontal frequency of 55 kHz and a voltage of 2.5V at a horizontal frequency of 31.5 kHz. Accordingly, a horizontal frequency fH of the horizontal frequency generation section 4 is inputted to the base of the transistor Q1 through the resistor R1, and a horizontal display size compensation signal inputted from the microcomputer 10 is supplied to the horizontal frequency fH through the resistor R7. The transistor Q3 amplifies a stable output current of the transistor Q1 controls current flowing in the coil L1 and the capacitor C2 to be outputted to the horizontal deflection coil H-DY, to thereby compensate for variations of a horizontal display size of a monitor screen.

With the horizontal display size compensation circuit for a monitor according to the present invention, a stable image is provided by preventing a horizontal display size of a monitor screen from being changed according to a video mode through application of a voltage corresponding to a horizontal frequency to a horizontal display size control section.

It should be understood that the present invention is not limited to the particular embodiment disclosed herein as the best mode contemplated for carrying out the present invention, but rather that the present invention is not limited to the specific embodiments described in this specification except as defined in the appended claims.

What is claimed is:

1. A horizontal display size compensation circuit for a monitor, comprising:

a horizontal frequency generation section for outputting a horizontal frequency corresponding to each video mode;

a microcomputer for outputting a horizontal display size control signal according to an input of a key input section, and for outputting a predetermined horizontal display size compensation signal according to the horizontal frequency corresponding to a video mode; and a horizontal display size control section for controlling a horizontal display size of a monitor screen according to the horizontal frequency of the horizontal frequency generation section and the horizontal display size control signal and the horizontal display size compensation signal of the microcomputer, the horizontal display size compensation signal of the microcomputer being supplied to the horizontal frequency which is inputted from the horizontal frequency generation section to the horizontal display size control section.

2. The horizontal display size compensation circuit for a monitor as claimed in claim 1, the horizontal display size compensation signal of the microcomputer being set to a predetermined voltage which increases as the horizontal frequency corresponding to a video mode increases.

3. The horizontal display size compensation circuit for a monitor as claimed in claim 2, the horizontal display size control section comprising:

a differential amplifier for receiving the horizontal frequency and the horizontal display size compensation signal at one input thereof and for receiving the horizontal display size control signal and a fed back output signal at another input thereof; and an output amplifier having an input connected to an output of said differential amplifier and having a capacitor and an inductor connected to an output thereof.

4. The horizontal display size compensation circuit for a monitor as claimed in claim 3, said differential amplifier comprising two bipolar transistors and a plurality of resistors.

5. The horizontal display size compensation circuit for a monitor as claimed in claim 3, said output amplifier comprising a bipolar transistor.

6. The horizontal display size compensation circuit for a monitor as claimed in claim 1, the horizontal display size control section comprising:

a differential amplifier for receiving the horizontal frequency and the horizontal display size compensation signal at one input thereof and for receiving the horizontal display size control signal and a fed back output signal at another input thereof; and an output amplifier having an input connected to an output of said differential amplifier and having a capacitor and an inductor connected to an output thereof.

7. The horizontal display size compensation circuit for a monitor as claimed in claim 6, said differential amplifier comprising two bipolar transistors and a plurality of resistors.

8. The horizontal display size compensation circuit for a monitor as claimed in claim 6, said output amplifier comprising a bipolar transistor.

9. The horizontal display size compensation circuit for a monitor as claimed in claim 1, the horizontal display size control section comprising:

a differential amplifier for receiving the horizontal frequency and the horizontal display size compensation signal at one input thereof and for receiving the horizontal display size control signal and a fed back output signal at another input thereof; and an output amplifier having an input connected to an output of said differential amplifier and having a capacitor and an inductor connected to an output thereof.

10. The horizontal display size compensation circuit for a monitor as claimed in claim 9, said differential amplifier comprising two bipolar transistors and a plurality of resistors.

11. The horizontal display size compensation circuit for a monitor as claimed in claim 9, said output amplifier comprising a bipolar transistor.

12. A horizontal display size compensation method for a monitor, comprising the steps of:

outputting a horizontal frequency corresponding to each video mode a with horizontal frequency generation section;

outputting a horizontal display size control signal according to an input of a key input section, and outputting a predetermined horizontal display size compensation signal according to the horizontal frequency corresponding to a video mode; and controlling a horizontal display size of a monitor screen according to the horizontal frequency of the horizontal frequency generation section and the horizontal display size control signal and the horizontal display size compensation signal, the horizontal display size compensation signal being supplied to the horizontal frequency which is inputted from the horizontal frequency generation section.

13. The horizontal display size compensation method for a monitor as claimed in claim 12, the horizontal display size compensation signal being set to a predetermined voltage which increases as the horizontal frequency corresponding to a video mode increases.

\* \* \* \* \*